Figure 1:
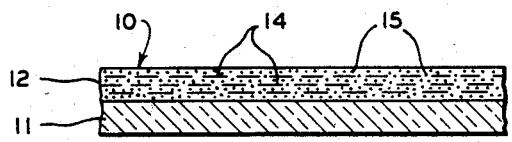

April 20, 1948.     E. H. LAND ET AL     2,440,105

IMAGE-CARRYING FILM HAVING LIGHT-POLARIZING AND NONPOLARIZING IMAGES

Filed April 9, 1945

INVENTORS:
Edwin H. Land and
Martin Grabau
BY Donald L. Brown
Attorney

Patented Apr. 20, 1948

2,440,105

UNITED STATES PATENT OFFICE 2,440,105

IMAGE-CARRYING FILM HAVING LIGHT-POLARIZING AND NONPOLARIZING IMAGES

Edwin H. Land, Cambridge, Mass., and Martin Grabau, Reading, Pa., assignors to Polaroid Corporation, Cambridge, Mass., a corporation of Delaware Application April 9, 1945, Serial No. 587,278

2 Claims. (Cl. 88—65)

The invention relates to an image-carrying film in which one or more dichroic and hence light-polarizing images, together with one or more non-polarizing images may be formed, the method of producing such a film and such images therein, as well as the product of such method and in addition a method of exhibiting or displaying the product or film.

Important objects of the invention are to provide a film in which one or more dichroic images, indicia, designs or the like and also one or more non-polarizing images, indicia, designs or the like may be formed and especially a film for this purpose which has an image bearing layer wherein both of the just mentioned types of images, indicia, designs or the like may be formed.

Other objects of the invention are the provision of processes for forming light-polarizing and non-polarizing images in a single carrier, particularly methods whereby images of the character described are formed in a layer of a transparent, molecularly oriented, hydrophilic, linear polymeric plastic by preferentially staining or dyeing the plastic with a dichroic stain or dye to provide a light-polarizing image or images therein and by incorporating a light-sensitive material in the plastic and preferentially exposing the material and forming at least one non-polarizing image in the plastic or by printing on the plastic with a printing ink or dye or the like of a substantially non-dichroic character whereby to provide one or more non-polarizing images in the plastic.

Further objects of the invention are to provide as a new article of manufacture, a film material in which there appears at least one light-polarizing image and at least one non-polarizing image and especially film material having an image bearing layer in which both types of images are present, the film material being in the form of moving picture film or a projection slide or being susceptible of mounting upon a base or support as a reflection print; to provide educational and advertising media having at least two images therein, one of which may be rendered substantially invisible in polarized light; and to provide a film of the character described having a layer formed of a transparent, molecularly oriented, hydrophilic, linear polymeric plastic such as polyvinyl alcohol in which there appears at least one light-polarizing image formed in the layer with a dichroic stain or dye and in which there also appears at least one non-polarizing image, for example a photographically formed silver image or a non-polarizing image formed by printing on the layer with a suitable printing ink or a dye or the like.

Still further objects of the invention reside in providing a method for displaying at least one pair of images in a manner wherein they are both normally visible and for causing one of said images to appear and disappear at will, as well as a method of the character described wherein a film having at least one light-polarizing image and at least one non-polarizing image formed in positions therein for simultaneous observations is displayed or exhibited to an observer in light vibrating in a manner to permit all images therein to be observed and wherein the film is displayed in light vibrating in a plane parallel to the polarizing axis of the light-polarizing image or images carried by the film whereby to render the light-polarizing image or images substantially invisible while leaving the visibility of non-polarizing image or images substantially unaffected.

With these and other objects in view, the invention consists in the several process steps and their relation to each other as well as to the various parts and combinations and to the special properties of the articles to be hereinafter set forth and claimed with the understanding that the steps of the process may be varied in the order and manner of their performance and that the different parts of the articles, as well as the special features and properties thereof, may be varied in character and degree without departing from the spirit of the invention or exceeding the scope of the appended claims.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

Figure 2:
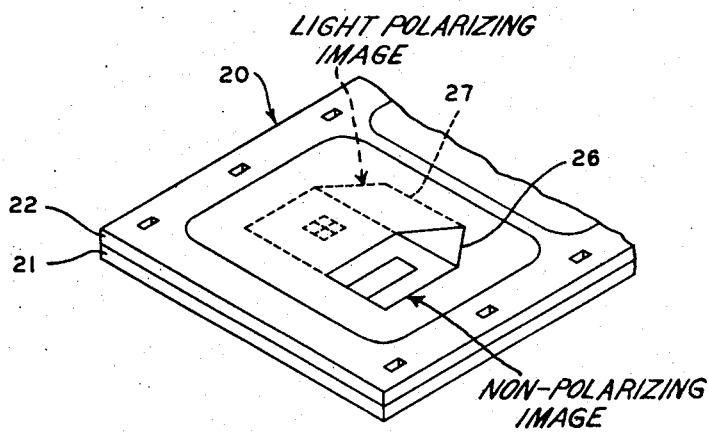

For a fuller understanding of the invention, reference should be had to the accompanying drawing in which:

Fig. 1 is a diagrammatic view in section of a sensitized transparent film employed by the invention; and Fig. 2 is a diagrammatic view in perspective and with parts broken away of a motion picture film after the formation of light-polarizing and non-polarizing images therein.

For educational and advertising purposes it is desirable to provide a moving picture film or a transparent slide or a reflection print having formed therein two normally visible images, one of which images may be rendered invisible when viewed in polarized light. For example, it is desirable to be able to add at will an auxiliary image in front or in back or on the sides of a main image, or to be able to present an auxiliary image and a main image in superposed relation to each other. The auxiliary image may be a part of the object portrayed in the main image, or it may be a different object entirely from that of the main image and may be shown as an accessory to the main image.

Instead of a single main image several of them may be used for each view to be reproduced. Similarly, one or more auxiliary images may be associated with a main image or with several main images. Thus a motion picture film may have one or more main images and one or more auxiliary images in each of certain predetermined frames thereof, or a transparent slide or reflection print may have one or more main images and one or more associated auxiliary images. To simplify the description of the invention, sets of a single main image and an associated auxiliary image will be considered, the manner of forming sets of images having one or more main and auxiliary images becoming apparent in connection with the following explanation.

The present invention fulfills this desire by providing an image carrying film having, or capable of having, at least two images formed therein. In the event the film is a moving picture film, at least two images are formed in each frame or in predetermined frames thereof. One of the images of each of such pairs of images is of a non-polarizing character and is always visible. This will be considered as the main image. The other image, which will be considered as the auxiliary image, is a dichroic image and hence light-polarizing. This light-polarizing image shows a photographic contrast which is a function of the direction of vibration of light incident thereon. As a result of this expedient, the auxiliary or light-polarizing image will be invisible when the photographic element is viewed in plane polarized light which is vibrating in a plane parallel to the polarizing axis of the auxiliary image. Also the light-polarizing image may be rendered invisible in circularly polarized light when properly positioned birefringent quarter-wave retardation material is associated with the film on the side of the light-polarizing image nearest the observer and the film is observed through a suitably oriented circular polarizer.

The usefulness of the invention may be illustrated in connection with an educational moving picture film. For example, in teaching mechanical drawing it may be desirable to show an end view of an object and in certain frames of the film show how lines added to the end view can convert it into a perspective view. The present invention is well adapted for this purpose. Normal or non-polarizing images of the end view of the object are formed in the various frames of the film and in desired frames there are formed light-polarizing images of the lines which provide the structure needed to convert the end view of the object to a perspective view.

Normally, the two sets of images will be observed on the screen to give a perspective view when any portion of the film in which both sets of images appear is projected. Making the added structure invisible is possible since each image which provides it is light-polarizing. Hence, if the film is projected with light which is polarized in a plane parallel to the polarizing axis of each light-polarizing image, the latter will be blanked out and the observer will only see the non-polarizing images of the end view of the object.

The film may be projected in unpolarized or polarized light for the purpose of exhibiting or displaying it. When the film is projected in unpolarized light both the non-polarizing and the light-polarizing images are visible. To render each light-polarizing image invisible, a suitable polarizing filter is placed in the path of the projected beam, the polarizing axis of the filter being arranged so that it is in parallel relation to the polarizing axis of the light-polarizing image. If the film is projected in polarized light which is vibrating in a plane perpendicular to the polarizing axis of the light-polarizing image, both the non-polarizing and polarizing images are visible. This permits a polarizing filter to be mounted in the projection beam so that it may be rotated into a position wherein its polarizing axis is perpendicular or parallel to the polarizing axis of the light-polarizing image or images to the end of controlling the disappearance of the light-polarizing image or images. Similar effects are obtained in connection with a reflection print by viewing it through a suitably oriented polarizing filter.

It is known that hydrophilic, transparent plastics having substantially oriented, long chain molecules may be rendered light-polarizing by staining or dyeing them with a dichroic stain or dye. At the same time, molecularly oriented plastic may be employed as a carrier for a light-sensitive material such as silver halide whereby to permit formation of a non-polarizing image therein. Non-polarizing images may also be formed in an oriented plastic by printing thereon with a printing ink, dye or the like which is at least substantially non-dichroic in that it will display insufficient dichroism to provide a usable light-polarizing image. These properties are made use of to form an image bearing layer in which both light-polarizing and non-polarizing images may be formed.

A film 10 by which the invention may be carried out is shown in Fig. 1. Film 10 comprises a base or support 11 on which is superposed an image bearing layer 12 formed of a transparent, molecularly oriented, hydrophilic, linear polymeric plastic. A light-sensitive substance such as silver halide may be incorporated in layer 12 for the purpose of allowing one or more non-polarizing images to be formed therein. The dash lines 14 indicate the oriented molecules of layer 12 and the dots 15 silver halide or other light-sensitive material incorporated in the layer.

While a light-sensitive material has been shown as contained in the layer 12, as previously intimated and as will more fully appear, the non-polarizing images may be formed in the layer by printing. When such an expedient is followed the layer 12 is oriented but is not sensitized.

Since the ultimate product of the invention is generally designed for projection, the base or support 11 is generally formed of a synthetic, transparent plastic although for the production of reflection prints the base may be a light-reflecting paper or a metalized paper backing may be bonded to the support 11 in providing a reflection print. It is also possible to form the support 11 of glass.

The molecularly oriented, image bearing layer 12 in which the light-polarizing and non-polarizing images are formed is a sheet of a transparent, high molecular weight polymer adapted to form a dichroic sorption complex with certain organic dyes, the polymer preferably being one which contains hydroxy groups. Examples of suitable polymers are polyvinyl alcohol, polyhydroxy alkane, partially hydrolyzed polyvinyl acetals and polyvinyl alcohol esters, and regenerated cellulose. Of the materials falling within this class, polyvinyl alcohol is preferred since light-polarizing images formed in a properly prepared sheet of that material possess very high dichroism. A light-sensitive material, when employed for non-polarizing image formation may be cast or imbibed in the image bearing layer or carrier 12.

Long chain plastics of the character just described may be rendered light-polarizing by substantially orienting their molecules and staining or dyeing the plastics with a dichroic material. Orientation may be effected by stretching plastic sheet until the molecules therein are sufficiently oriented. Alternatively, the surface molecules of one or both sides of a plastic sheet may be oriented as by application of linear, frictional forces thereto without orienting the molecules throughout the remainder of the sheet. In surface orientation, the oriented region adjacent the surface is of sufficient thickness to give dichroism when stained or dyed. The dichroic stain or dye and therefore any dichroic image derived therefrom should not penetrate beyond the oriented region at the surface and into the unoriented region of the plastic. When a light-sensitive material is cast in the plastic carrier the molecules of the carrier are oriented after the carrier has been formed. On the other hand, when the light-sensitive material is placed in the carrier by imbibition, the molecules of the carrier may be oriented either before or after the incorporation of the light-sensitive material therein. When the non-polarizing image or images are formed by printing, the molecules of the carrier layer are oriented prior to image formation.

As already indicated, the base or support 11 is preferably formed of a transparent plastic other than gelatin although it may be of glass or of paper. Examples of suitable plastic support materials comprise a cellulosic plastic, such as cellulose acetate and cellulose nitrate, or vinyl compounds, such as the vinyl acetate-vinyl chloride copolymers, or a condensation type superpolymer, such as polyamide or nylon type plastic. Cellulose nitrate and cellulose acetate may be mentioned as being admirably suited for use as support materials. In addition any of the plastics named as suitable for forming the layer 12 may be used as support materials.

Layers 11 and 12 of film 10 are adapted to be bonded to each other by suitable practices. For example, polyvinyl alcohol can be laminated to cellulose nitrate with water when the cellulose nitrate is subcoated with a suitable partially hydrolyzed polyvinyl acetate such as is sold by E. I. du Pont de Nemours & Company under the designation of PVA RH-491. Cellulose acetate can be subcoated first with cellulose nitrate and then with PVA RH-491 for lamination to polyvinyl alcohol, water being used as the laminating agent. Polyvinyl alcohol can be laminated to polyvinyl alcohol or regenerated cellulose with water in the event either of the two last named plastics are employed to form the support layer of the photographic element.

When the non-polarizing images are formed by photographic practices silver halides as a class are intended for use with the invention. Preferred silver halides are silver chloride, or silver bromide or mixtures thereof. Silver iodide, usually in small quantities, may be included as a sensitizing material. Silver halide is formed by the usual reaction when solutions of alkali halide and silver nitrate are mixed within the plastic which forms the image-bearing layer of the film. Incorporation of the silver halide within the plastic is carried out by adding the sensitizing solutions to a plastic dope which is subsequently cast to form the desired sheet or by imbibing the sensitizing solutions into already formed plastic sheet.

The invention contemplates the use of materials other than silver halide for sensitizing the layer 12. As further examples, dichromates and diazo compounds may be named. However, for the purpose of the invention silver halide is a preferred material which is simple to employ and process and which gives highly satisfactory results.

Materials other than the sensitizing solutions may be incorporated in the image bearing layer. For example, silver halide is primarily sensitive to blue and near ultra-violet light. A sensitizer is customarily added to silver halide emulsion to extend its range of sensitivity. Erythrosin is a conventional sensitizer for this purpose. In addition to a sensitizer, hardening agents, plasticizers and the like can be incorporated in the image bearing layer. In certain instances, but not by way of necessity, gelatin may be added to a light-sensitive dope to vary the properties thereof.

As already pointed out, the invention intends to provide motion picture, roll or cut film which may be used as either positive or negative forming film materials in the formation of transparencies or the production of reflection prints. The film 10 is particularly adapted for use as a motion picture film and especially as printing material for the formation of positive reproductions. When used for motion picture purposes, light-polarizing and non-polarizing images may be formed in each frame of the film or the light-polarizing images may be formed only in predetermined frames of the film.

When the film 10 of Fig. 1 is made light-sensitive, one or more non-polarizing or silver images and one or more light-polarizing or dichroic images are formed therein by procedures to be immediately described. In the formation of such images in an image-bearing layer it is immaterial to the practice of the invention whether the non-polarizing or light-polarizing images are first formed, the order of producing the different types of images not being important.

Formation of one or more non-polarizing images in a film 10, which has been rendered light-sensitive with silver halide, proceeds by differentially exposing the film to light to form one or more latent images therein. Assuming that a positive motion picture film is being produced and that the film to be printed is sensitized with silver halide, latent images are formed in the frames of the sensitized film by standard printing methods making use of a negative film which contains the images to be reproduced. The negative film is located in proper register with the image bearing layer wherein the images are to be formed. Subsequent to exposure, any latent image in layer 12 is developed to a silver image by customary procedure after which the film 10 may be fixed in the usual manner. The result of this procedure is to provide a non-polarizing or silver image in each area of the film 10 which has been exposed to light. Exposure of film 10 for latent image formation may be made onto either side thereof when the support 11 is of transparent material.

As previously mentioned, non-polarizing images may be provided by printing, the printed images being formed in suitable positions in the carrier. Well known printing inks or pigments are suitable for this purpose since materials of this class are generally non-dichroic. Inks employed may be either of a water-insoluble or a water-soluble character. Where a transparency is being provided, a transparent ink is employed. Any standard printing practice may be used for applying the printing ink or the like onto the image carrying layer in non-polarizing image formation and all such printing practices are deemed to fall within the scope of the invention.

Substantially non-dichroic dyes may also be employed for the formation of non-polarizing images. These may be applied by standard printing practices or through use of a wash-off relief method to be hereinafter set forth. The dye images are formed in suitable positions in the carrier. There are many dyes which show dichroism. Numerous dyes, however, do not possess sufficient dichroism to provide a useable light-polarizing image when they are incorporated in molecularly oriented plastic. The last mentioned dyes along with dyes which show no dichroism are referred to in the specification and claims as being substantially non-dichroic. Examples of substantially non-dichroic dyes suitable for this purpose include Pontachrome Black P. V. (Color Index 170); Rubrex Red (C. I. 163); and Serichrome Blue R (C. I. 180).

When a non-polarizing image is printed, it may be formed in the carrier 12 either before or after the formation of any light-polarizing image. Whether the non-polarizing images are formed photographically or by printing will be dependent upon the use to which the final product is to be put. For example, if a film is being provided for projection purposes it will be preferred to form the non-polarizing image or images by photographic procedure. On the other hand, in the formation of some reflection prints, as for example in illustrating a book or the like, it will be preferable to provide the non-polarizing image by printing them.

Formation of one or more light-polarizing images in the image bearing layer may be effected in the manner described in Patent No. 2,315,373, issued March 30, 1943, to E. H. Land, for Process for forming light-polarizing images, by applying a wash-off gelatin relief which has been imbibed in a dichroic stain or dye onto the layer. Images to be reproduced as dichroic or light-polarizing images are formed in the wash-off relief which is prepared by exposing colloid relief material through a negative of the film to be reproduced if a positive reproduction is desired. After exposure, the relief is developed and may be fixed by standard practices.

The developed relief, in which there is formed one or more images to be transferred to an image bearing layer such as layer 12, is imbibed in a suitable solution of a dichroic stain or one or more dichroic dyes and is then placed in layer 12 in proper register therewith after which it is pressed into contact with the surface of the layer. The result is to provide in the layer 12 a light-polarizing image in terms of a dichroic stain or dye in each area of the layer 12 contacted by an image in the wash-off relief.

A preferred dichroic stain is one comprising iodine in combination with an iodide which forms with the iodine a polarizing polyiodide. Suitable iodides for use in the preparation of such a stain are, for example, sodium iodide and ammonium iodide. They are preferably employed with a relatively small amount of iodine. A suitable solution, for example, for staining polyvinyl alcohol, may be formed by preparing a solution of 20 grams of ammonium iodide in 100 c. c. of water, dissolving therein 1.0 gram of iodine, and adding thereto a solution of 50 grams of ammonium iodide in 500 c. c. of water. Other quantities of the iodide may be used. By altering the quantity of the iodide employed, predetermined changes in the extinction color of the image formed may be obtained. Stains produced from solutions of iodine and iodides may be described as stains formed by polarizing polyiodides.

Dyes suitable for forming light-polarizing images comprise water-soluble, dichroic dyes such, for example, as direct cotton dyes of the azo type, or dichroic dyes prepared from fast color salts. Such dyes should be selected for their ability to show high dichroism when applied to a properly oriented sheet of a plastic such as polyvinyl alcohol, and preferred examples thereof will be found, with few exceptions, in the disazo, trisazo, stilbene, thiazole and pyrazolone groups. Dyes of this character may be used singly for the production of monochromatic images or in combination or mixtures to produce various color effects.

As particular examples of dyes, mention is made of Solantine Red 8BL (C. I. 278); Solantine Pink 4BL (C. I. 353); Erie Yellow Y (C. I. 365); Stilbene Yellow 3GA (C. I. 622); Solantine Yellow FF (C. I. 814); Pontamine Sky Blue 6BX greenish (C. I. 518); Pontamine Fast Green 5BL; Niagara Sky Blue 6B (C. I. 518); Erie Black GXOO (C. I. 581); and Amanil Black WD.

Fig. 2 shows a motion picture film 20 after image formation therein by the practices set forth in the foregoing, film 20 being similar to film 10 of Fig. 1 in that it comprises a support or base 21 on which is superposed an image-bearing layer 22. In the frame of the film disclosed completely in Fig. 2, an image of a drawing of an end elevation of a house is shown as a silver or non-polarizing image 26 and is illustrated in full lines. Also in this frame of the film, structure necessary to complete a perspective of the house is shown in dash lines as providing a light-polarizing image 27. In film 20, the non-polarizing image 26 will always be visible while the light-polarizing image 27 may be made to appear and disappear in accordance with the vibration direction of light incident thereon.

For the sake of simplicity of illustration, the images in Fig. 2 have been shown as forming a line drawing. It is to be understood however, that the concept of the invention extends to all types of photographic reproduction and is intended to include half tone and full tone reproductions. In this regard it is to be noted that images other than those shown as forming a house may be formed by the practice of the invention and the term "image" as used herein is intended to cover any design, indicium or the like or a part thereof.

As will be well understood by the art, variations may be made in the photographic films herein described. For example, if the respective image-bearing layers 12 or 22 of the films 10 and 20 are made sufficiently thick, their respective supports 11 and 21 may be dispensed with. It is also possible, as heretofore intimated, to employ circular polarizers and circularly polarized light for viewing purposes. In using circularly polarized light, the supports for the image-bearing layer of the film may be rendered birefringent by suitable stretching to provide the well-known quarter-wave retardation effect on polarized light transmitted therethrough and the layer which carries the light-polarizing image may have its molecules oriented at 45° to an edge of the film.

It has been pointed out that a light-polarizing or dichroic image has an optical density which is a function of the direction of vibration of light incident thereon. This is true of each light-polarizing image produced in all embodiments of the invention. Such images are known as "vectographs," and it is to be understood that the invention embraces within its scope the combination of a vectograph image and a nonpolarizing or ordinary image.

Throughout the specification and claims where the term "hydrophilic" is employed, reference is made to layers for a film which are formed of a substance or material other than gelatin that shows an affinity for water or has the ability to absorb or adsorb water.

The term "dichroism" is used herein and in the claims as meaning the property of differential absorption of the components of an incident beam of light depending upon the vibration directions of said components.

Likewise, throughout the specification and claims the term "dichroic" as applied to a material or a dye or a stain means a material or a dye or a stain whose molecules possess the property of showing dichroism. In the practice of the invention, this property is displayed when such material or dye or stain is incorporated in molecularly oriented, hydrophilic plastics of the character described in that the resulting areas containing the same show dichroism.

Also, as used in the specification and claims, the term "polarizing axis" is applied to a material which will transmit unpolarized light in a polarized condition and means the axis of such material to which the direction of vibration of plane polarized light must be parallel in order that the plane polarized light be transmitted through the material.

From the foregoing it will be appreciated that the aims and objects of the invention have been accomplished in that there has been provided a film in which one or more light-polarizing or dichroic images together with one or more nonpolarizing images may be formed. In addition, the invention has provided methods for producing light-polarizing and non-polarizing images in an image-carrying film and also the product of such methods as well as practices for exhibiting a film having light-polarizing and nonpolarizing images to the end of displaying at will both types of images simultaneously or displaying only non-polarizing images.

Since certain changes in carrying out the above process, and certain modifications in the article which embody the invention may be made without departing from its scope, it is intended that all matter contained in the above description shall be interpreted as illustrative and not in a limiting sense.

What is claimed is:

1. In a film comprising a support and a single image-carrying layer of a substantially transparent, hydrophilic, molecularly oriented linear polymeric plastic, in combination a dichroic material incorporated in at least one predetermined portion of said layer and rendering such portion light polarizing in character, and metallic silver contained in at least one other predetermined portion of said layer, each portion of said layer containing silver forming an individual main image which is visible in polarized light and in unpolarized light, and each portion of said layer containing said dichroic material forming an individual image which is auxiliary to a main image of silver and which in conjunction with said silver image is visible in unpolarized light but which in plane polarized light has an optical density that is a function of the direction of vibration of said polarized light.

2. In a film comprising a support and a single image-carrying layer of substantially transparent, molecularly oriented polyvinyl alcohol, in combination, iodine incorporated in at least one predetermined portion of said layer and rendering such portion light-polarizing in character, and metallic silver contained in at least one other predetermined portion of said layer, each portion of said layer containing silver forming an individual main image which is visible in polarized light and in unpolarized light, and each portion of said layer containing said iodine forming an individual image which is auxiliary to a main image of silver and which in conjunction with said silver image is visible in unpolarized light but which in plane polarized light has an optical density that is a function of the direction of vibration of said polarized light.

EDWIN H. LAND.
MARTIN GRABAU.

REFERENCES CITED

The following references are of record in the file of this patent:

UNITED STATES PATENTS

| Number | Name | Date |
|---|---|---|
| 1,422,527 | Berger | July 11, 1922 |
| 2,165,974 | Land | July 11, 1939 |
| 2,203,687 | Land et al. | July 11, 1940 |
| 2,238,207 | Ames, Jr., et al. | Apr. 15, 1941 |
| 2,280,297 | Neumueller et al. | Apr. 21, 1942 |
| 2,289,714 | Land | July 14, 1942 |
| 2,289,715 | Land | July 14, 1942 |
| 2,311,058 | Lowe | Feb. 16, 1943 |
| 2,312,852 | Toland et al. | Mar. 2, 1943 |
| 2,315,373 | Land | Mar. 30, 1943 |
| 2,329,543 | Land | Sept. 14, 1943 |
| 2,360,225 | Hanson, Jr., et al. | Oct. 10, 1944 |
| 2,373,035 | Land | Apr. 3, 1945 |

OTHER REFERENCES

Dudley article in Photo-Technique, May 1941, pages 30-33, inclusive. (Copy in 88-65.)